US010145540B2

(12) United States Patent
Jurik et al.

(10) Patent No.: US 10,145,540 B2
(45) Date of Patent: Dec. 4, 2018

(54) BEAN CONTROL SYSTEM FOR AN LED LUMINAIRE

(75) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 13/225,534

(22) Filed: Sep. 5, 2011

(65) Prior Publication Data

US 2012/0134151 A1 May 31, 2012

Related U.S. Application Data

(63) Continuation of application No. 13/018,203, filed on Jan. 31, 2011, now Pat. No. 8,496,354.

(60) Provisional application No. 61/417,194, filed on Nov. 24, 2010.

(51) Int. Cl.
*F21V 11/16* (2006.01)

(52) U.S. Cl.
CPC .................................... *F21V 11/16* (2013.01)

(58) Field of Classification Search
USPC ............ 362/279, 290, 342, 343, 311.02, 325
See application file for complete search history.

(56) References Cited

U.S. PATENT DOCUMENTS

| | | | | |
|---|---|---|---|---|
| 7,517,113 | B2 * | 4/2009 | Bruckner | 362/290 |
| 7,587,109 | B1 * | 9/2009 | Reininger | 385/116 |
| 2009/0009861 | A1 * | 1/2009 | Hyobu | 359/456 |

* cited by examiner

*Primary Examiner* — Laura Tso
(74) *Attorney, Agent, or Firm* — Conley Rose, P.C.; Grant Rodolph; Brooks W Taylor

(57) ABSTRACT

Described are an improved automated multi source luminaire and luminaire systems. More particularly a multicolor LED array luminaire system with a series of lenses and light louvers to control the light beam.

11 Claims, 12 Drawing Sheets

BEAN CONTROL SYSTEM FOR AN LED LUMINAIRE

RELATED APPLICATION

The present application is a continuation of U.S. patent application Ser. No. 13/018,203 filed Jan. 31, 2011 by Pavel Jurik, et al. entitled "Beam Control System for an LED Luminaire", now U.S. Pat. No. 8,496,354, issued on Jul. 30, 2013, which claims priority to U.S. Provisional Application No. 61/417,194 filed on Nov. 24, 2010 by Pavel Jurik, et al. entitled, "Beam Control for an LED Luminaire".

TECHNICAL FIELD OF THE INVENTION

The present invention generally relates to a method for controlling the light output from an array of LEDs when used in a light beam producing luminaire, specifically to a method relating to preventing spill light and/or for controlling the beam angle of the array.

BACKGROUND OF THE INVENTION

High power LEDs are commonly used in luminaires—for example in the architectural lighting industry in stores, offices and businesses as well as in the entertainment industry in theatres, television studios, concerts, theme parks, night clubs and other venues. These LEDs are also being utilized in automated lighting luminaires with automated and remotely controllable functionality. For color control it is common to use an array of LEDs of different colors. For example a common configuration is to use a mix of Red, Green and Blue LEDs. This configuration allows the user to create the color they desire by additively mixing appropriate levels of the three colors. For example illuminating the Red and Green LEDs while leaving the Blue extinguished will result in an output that appears Yellow. Similarly Red and Blue will result in Magenta, and Blue and Green will result in Cyan. By judicious control of these three controls the user may achieve any color they desire within a color gamut. More than three colors may also be used and it is well known to add an Amber or White LED to the Red, Green and Blue to enhance the color mixing and improve the gamut of colors available.

The differently colored LEDs may be arranged in an array in the luminaire where there is physical separation between each LED, and this separation, coupled with differences in die size and placement for each color, may affect the spread of the individual colors and results in objectionable spill light and/or color fringing of the combined mixed color output beam. It is common to use a zoom lens or other optical device in front of each LED to allow the user to control the beam shape and angle of the output beam; however these optical devices commonly have differing effect for different colors and color fringing or other aberrations may be visible in the output beam. It would be advantageous to have a system where the beam angle is remotely variable and where stray light and aberrations are well controlled.

There is a need for a beam control system for an LED array based luminaire which can be remotely variable and provide improvements in spill light reduction and beam angle control.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to a method for controlling the light output from an array of LEDs when used in a light beam producing luminaire, specifically to a method relating to preventing spill light and for controlling the beam angle of the array.

Figure 1:
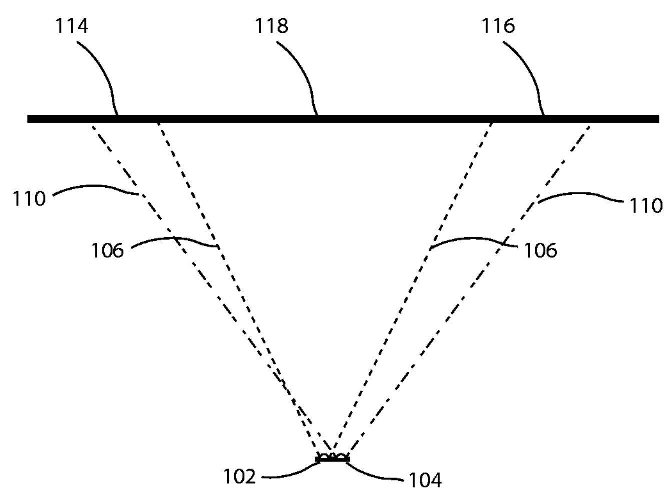
FIG. 1 illustrates a prior art system.

FIG. 1 illustrates a prior art system showing two LEDs as may be used in a luminaire. LED 102 and LED 104 may be of differing colors and, due to the different optical properties and construction of the LED dies, respectively produce light beams 106 and 110. These beams may differ in beam spread and position. These differences result in light beams from LEDs 102 and 104 impinging on an illuminated object 118 in such a way that areas 114 and 116 of the object are illuminated by a single LED only rather than the desired mix of both. This results in areas 114 and 116 being colored differently from the central mixed area and appearing as colored fringes. Only Two (2) LEDs are illustrated in FIG. 1 for clarity and simplicity. It should be appreciated that the same problem exists with systems incorporating more than two colors of LED. In addition to multiple colors of LEDs the luminaire may incorporate multiple sets of luminaires and the spacing between the LEDs and sets of LED's may vary within a single luminaire or in different luminaire designs.

Figure 2:
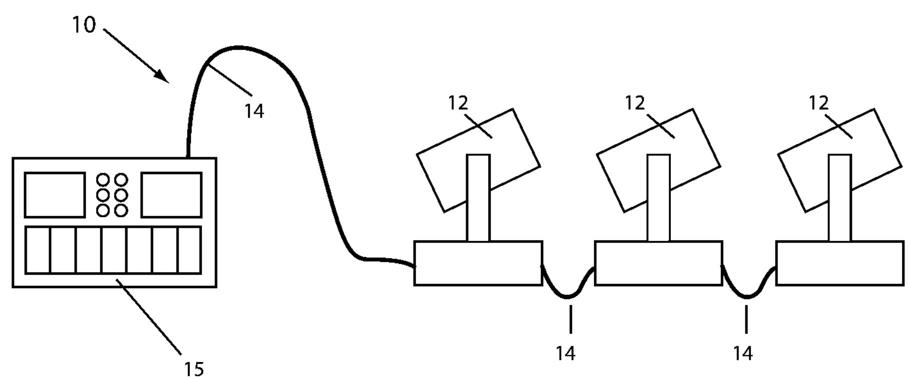
FIG. 2 illustrates a typical automated lighting system.

FIG. 2 illustrates a typical multiparameter automated LED luminaire system 10 which may incorporate the invention. These systems commonly include a plurality of multiparameter automated luminaires 12 which typically each contain on-board an array of LEDs, and electric motors coupled to mechanical drives systems and control electronics (not shown). In addition to being connected to mains power either directly or through a power distribution system (not shown), each luminaire is connected is series or in parallel to data link 14 to one or more control desk(s) 15. The luminaire system 10 is typically controlled by an operator through the control desk 15. Consequently, to affect this control, both the control desk 10 and the individual luminaires typically include electronic circuitry as part of the electromechanical control system for controlling the automated lighting parameters.

Figure 3:
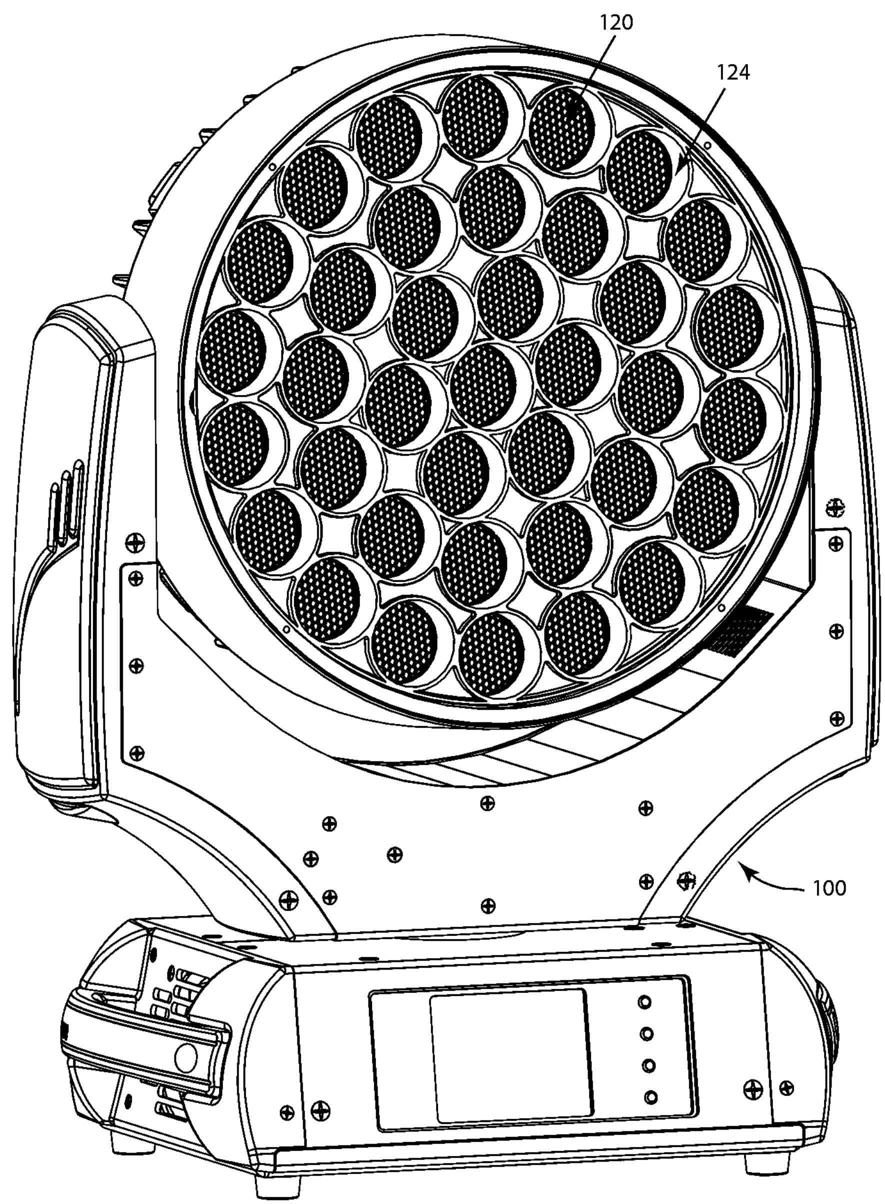
FIG. 3 illustrates an embodiment of the invention.

FIG. 3 illustrates an automated luminaire embodiment of the invention. Luminaire 100 contains multiple LED modules each of which is fitted with primary optics, first and second micro lens arrays and relatively small 120 and large 124 louver masks. Different louver masks 120 and 124 may have different heights and width louvers array. By changing the louver masks to ones with different heights of louver array the user may control the beam angle, stray light and color fringing of the luminaire in addition to that control provided by the variable focal length micro lens arrays system described in greater detail below. Louver mask arrays 120 and 124 may further provide mechanical protection and dust exclusion for the micro lens arrays and LED modules.

Figure 4:
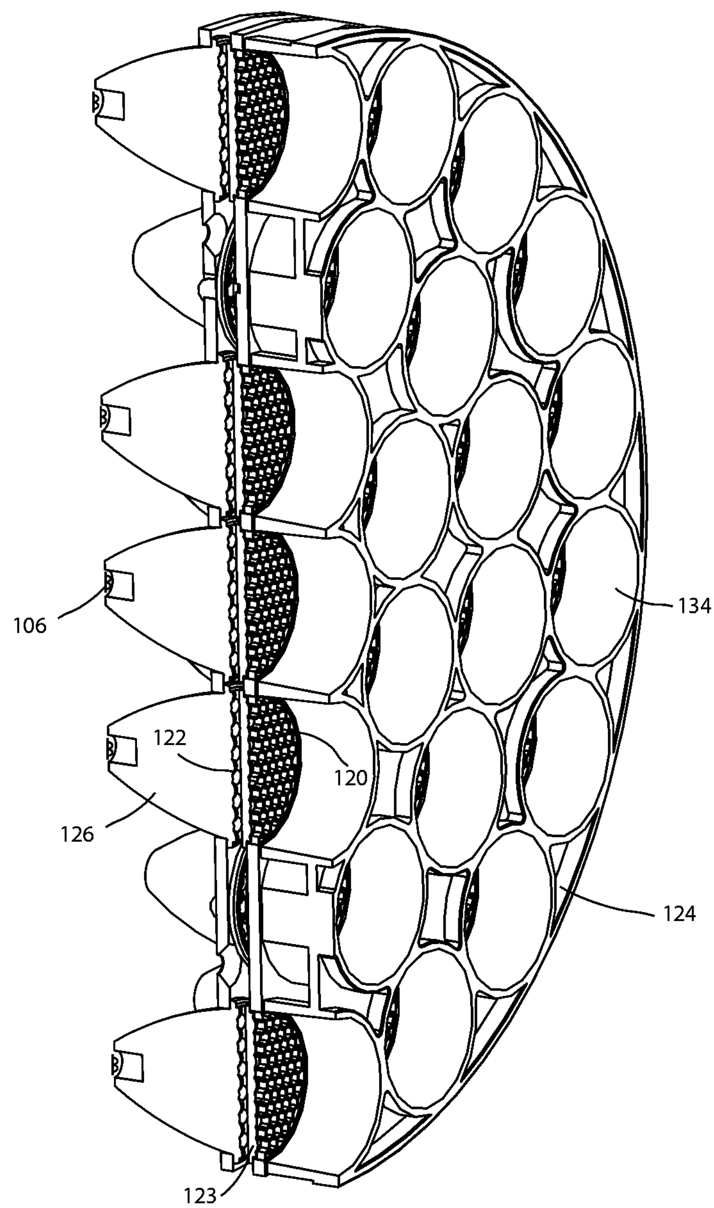
FIG. 4 illustrates a cut-away view of components of the embodiment of the invention illustrated in FIG. 3.

FIG. 4 illustrates a cut-away view of assembled light path components of a embodiment of the dual louvered LED arrays from the automated luminaire 100 of FIG. 1. From left to right individual LED module(s) 106 is/are paired with primary optic(s) 126, which in turn is/are paired with a first micro lens array 122, which in turn is paired with a second micro lens array 123, which in turn is paired with small louver array mask 120, which in turn is paired with large louver mask 134. In the embodiment illustrated in FIG. 4, the LED modules 106 are configured in an array and the large louver masks 134 also forms an array 124 where each LED Module 106 is paired a large louver mask 134 in the large louver mask array 124.

In various embodiments Each LED module 106 may comprise a single LED die of a single color or a group of LED dies of the same or differing colors. For example in one embodiment LED 106 comprises one each of a Red, Green, Blue and White die. In some embodiments these LED die(s) may be paired with optical lens element(s) as part of the LED module. Though the LED modules 106 shown are illustrated as individual pieces, in various embodiments these modules 106 may set out in an array of multiple modules as a one piece or multiple pieces. Similarly the primary optics 126 are illustrated as one piece per LED module. In other embodiments the primary optics may be configured in an array of multiple primary optics to be paired with an array of multiple LED modules. Likewise the first micro lens arrays 122 are illustrated as individual pieces. In other embodiments the first micro lens arrays 122 may be part of a larger array to be paired with an array of multiple LED modules.

Figure 5:
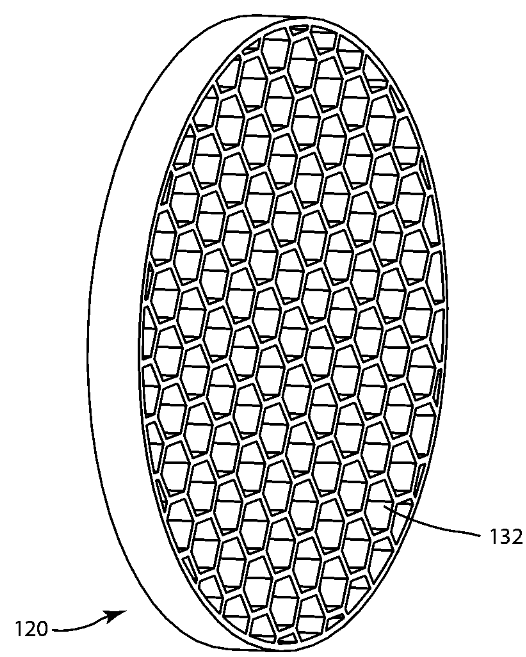
FIG. 5 illustrates a small louver mask of an embodiment of the invention.
Figure 7:
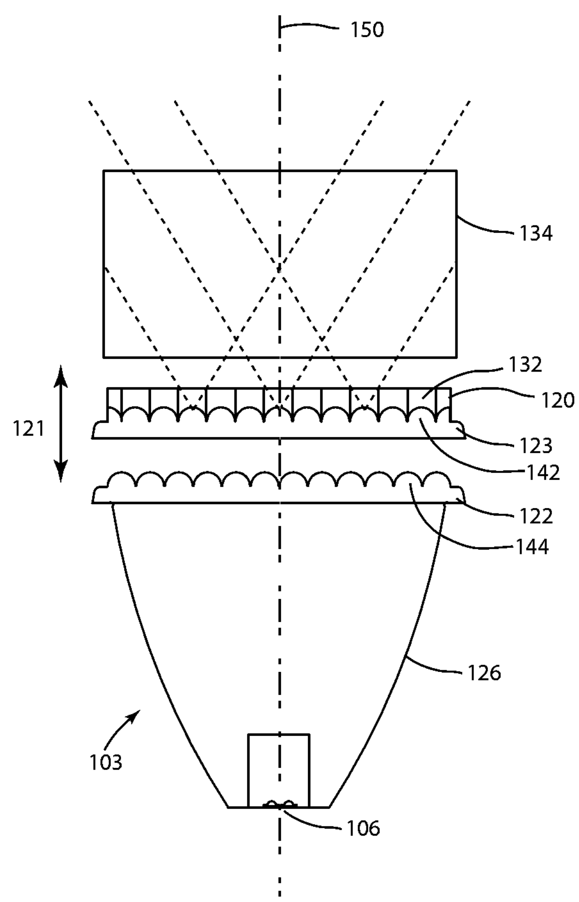
FIG. 7 illustrates a single module of the embodiment of the invention illustrated in FIG. 3.
Figure 8:
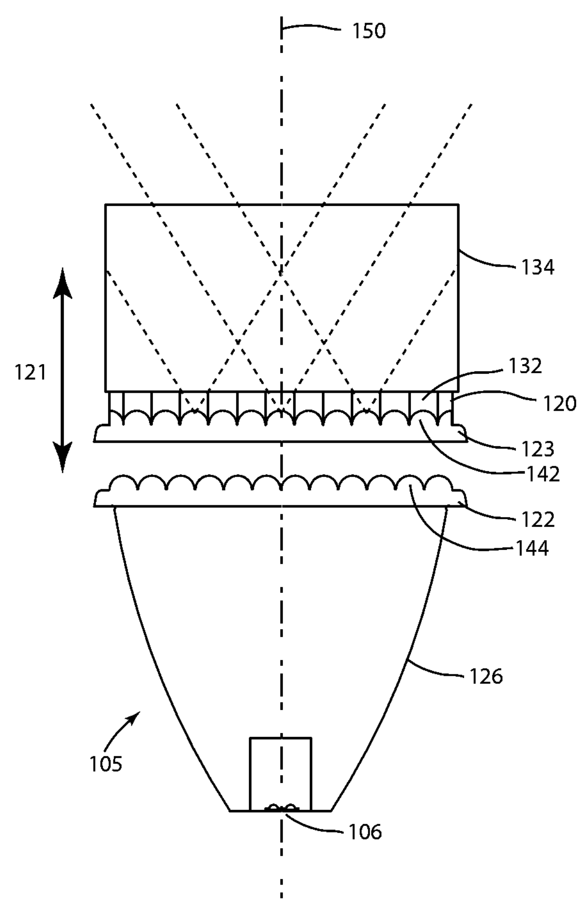
FIG. 8 illustrates a single module of an alternative embodiment of the invention.

FIG. 5 illustrates a small louver mask array of an embodiment of the invention. Louver mask 120 contains multiple cells 132 each of which may be aligned with a single lens 142 of second micro lens array 123 as illustrated in FIG. 7 and FIG. 8. The illustrated louver mask utilizes hexagonal cells 132 however in other embodiments the cells may make up any shape such as round, triangular, square, or other shape(s). In the embodiment shown, the small louver mask array is shown as a piece for a single LED module 106 (not shown in this figure). In other embodiments where there is an array of LED modules 106, the small louver mask arrays may in turn be configured as an array of small louver masks to be paired with an array of LED modules 106. In other embodiments the small louver mask may be a single part that covers multiple LED modules 106.

In one embodiment of the invention every louver mask 120 on each module in the luminaire is identical and every cell 132 within those masks is also identical but in further embodiments the louver masks 120 or cells 132 may differ within a single module or between different modules across the luminaire. In yet further embodiments the height of louver mask array 120 may be varied to effect different controlled beam angles for the emitted light. Such combinations of differing optical elements and louver array height may be advantageously chosen so as to allow fine control of the beam shape and quality. The louver mask arrays reduce color fringing or halation and control the beam angle to provide the lighting designer with a well controlled and defined beam of a single homogeneous color.

Figure 6:
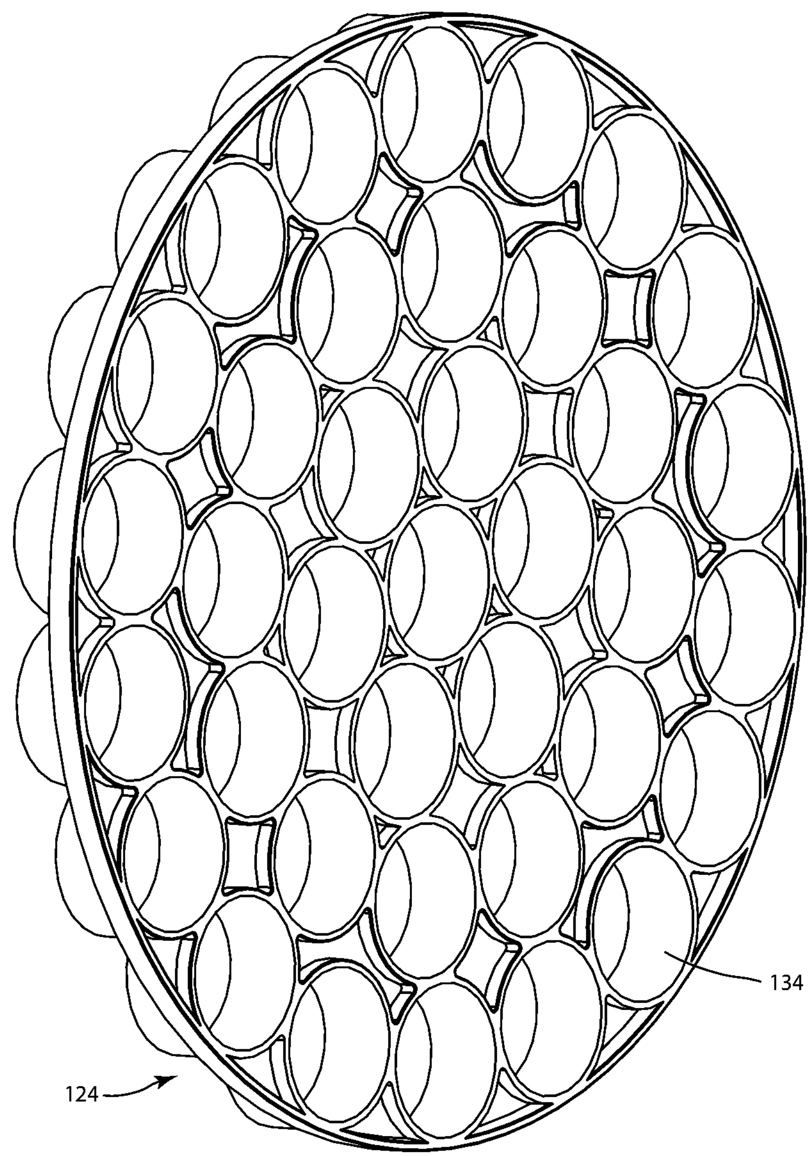
FIG. 6 illustrates a large louver mask of an embodiment of the invention.

FIG. 6 illustrates the large louver masks array 124 of the embodiment of the invention illustrated in FIG. 3 and FIG. 4. Louver mask array 124 contains multiple cells 134 each of which may be aligned with an LED module 106 (not shown in FIG. 6) and its associated primary optic 126 (not shown in FIG. 6), first 122 (not shown in FIG. 6) and second micro lens array 123 (not shown in FIG. 6) and first, small, louver mask 120 (not shown in FIG. 6). The illustrated louver mask utilizes round cells 134 however in other embodiment other cell shapes may be employed.

In one embodiment of the invention every louver mask cell 134 is identical but in further embodiments the louver mask cells 134 may differ at different positions across the array. In yet further embodiments the height of cells 134 of louver mask array 124 may be varied to effect different controlled beam angles for the emitted light. Such combinations of differing optical elements and louver array height may be advantageously chosen so as to allow fine control of the beam shape and quality.

FIGS. 7 and 8 illustrate operation of the various optical elements of the luminaire as they relate to a single LED module 106 of an embodiment of the invention in two different embodiments 103 and 105. The light output from an LED module 106 which may contain multiple LEDs of the same or differing colors enters primary optic 126. Primary optic 126 provides beam collimation and may be a reflector or a lens utilizing total internal refection (TIR). After passing through and being constrained by primary optic 126 the light beam enters first and second micro lens arrays 122 and 123 comprised of micro lenses 144 and 142 respectively. In the embodiment illustrated the first micro lens array 122 is fixed in position relative to LED module 106 and primary optic 126 while second micro lens array 123 is able to move 121 along or parallel to the optical axis 150 of the system. The two micro lens arrays 122 and 123 together form an optical system whose focal length may be varied by moving second micro lens array 123 towards and away from first micro lens array 122 as indicated by arrow 121. The micro lenses in micro lens arrays 122 and 123 may both face in the same direction as illustrated here or may face in opposing directions. The use of micro lens arrays as opposed to single larger lenses has a number of advantages, including but not limited to:

a. Micro lens arrays may be significantly thinner than a single lens of the same focal length and thus lighter and easier to move.

b. Micro lens arrays may provide homogenization of the light beam as well as altering the beam divergence.

In the present disclosed embodiment second micro lens array 123 is associated with a first, small, louver mask 120 which may be attached to second micro lens 123 and will move along the optical axis with it. Small louver mask 120 may be in contact with second micro lens array 123 in order to maximize the effectiveness and prevent any stray light from passing underneath small louver mask 120. As the combination of second micro lens array 123 and associated small louver mask 120 traverses backwards and forwards along or parallel to the optical axis 150 of the optical system as indicated by arrow 121 the focal length of the optical system formed by micro lens arrays 122 and 123 and primary optic 126 will vary, and thus the divergence of the light beam exiting second micro lens array 123 will vary as it passes through small beam louver 120. This resultant output beam is then further constrained by second, large, beam louver 124.

Figure 9:
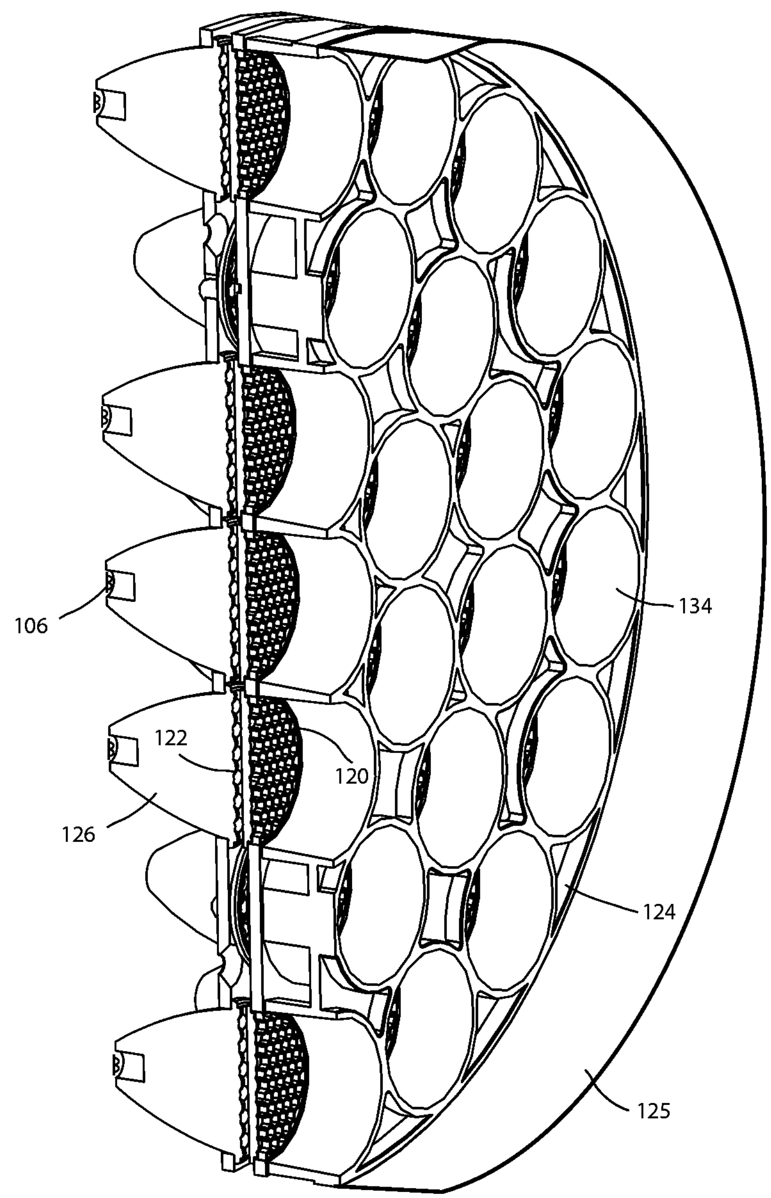
FIG. 9 illustrates a cut-away view of an embodiment of the invention.

Large beam louver 124 may be in a fixed position relative to LED module 106, primary optic 126 and first micro lens array 122 as shown with embodiment 103 as illustrated in FIG. 7 or may be allowed to traverse along the optical axis of the optical system in conjunction with small louver mask 120 and micro lens array 123 as shown with embodiment 105 as illustrated in FIG. 8 and indicated by arrow 121. In either configuration large beam louver 124 provides a further masking of any stray light from the variable focal length system and further serves to eliminate colored fringing from the light beam. An advantage of the embodiment illustrated in FIG. 7 is that the output louver 124 does not move. The advantage of the embodiment illustrated in FIG. 8 is that the controlling effects of the louver are consistent throughout the range of beam angle control when it remains adjacent to the first louver mask array 120. FIG. 9 illustrates that a final, third, overall louver mask 125 may optionally be fitted to the luminaire. Such a louver mask is commonly known in the art as a 'top hat' and, in the described embodiments, will cooperate with the louver masks 120 and 124 to further control any remaining light spill from the luminaire. Optional louver mask 125 may advantageously be provided as a removable component such that the user may easily insert or remove it from the luminaire as desired. Optional louver mask 125 may be of fixed height or may be adjustable. Optional louver mask 125 may advantageously be non-reflective so as to avoid spill light, this may be achieved by painting or coating the louver mask with matte black paint, anodizing or other coating as known in the art.

It can be seen that changing the heights of one or both louver masks 120 and 124 will alter the constrained beam angle of the output beam. A taller louver will produce a narrower beam and a shorter louver will produce a wider beam. The louver masks 120 and 124 may be of fixed height or may be adjustable.

As previously described Louver masks 120 and/or 124 may be non-reflective so as to avoid spill light, this may be achieved by painting or coating the louver mask with matte black paint, anodizing or other coating as known in the art.

The louver masks 120 and/or 124 may be made of a metal, plastic, glass or other suitable material. As previously discussed the materials may have effective transparency of zero percent (0%). In alternative embodiments the louver 120 and/or 124 materials may have a non-zero percent transparency between zero and approaching full transparency (0%<t<100%). In differing embodiments the materials can be clear or deffuse or clear with defusing surface treatments. The effect of non-opaque louvers is to illuminate the space between the microlens arrays 123 and/or between the lenses 142 with in a single microlens array 123 and thus fill with light these spaces resulting in decreased appearance of pixellation of the fixtures.

LED module 106 may contain LEDs of a single color and type or of multiple colors. The invention is not limited by the number, colors, or types of LEDs used and is applicable with any layout of any number of any type and any color of LEDs or OLEDs.

Figure 10:
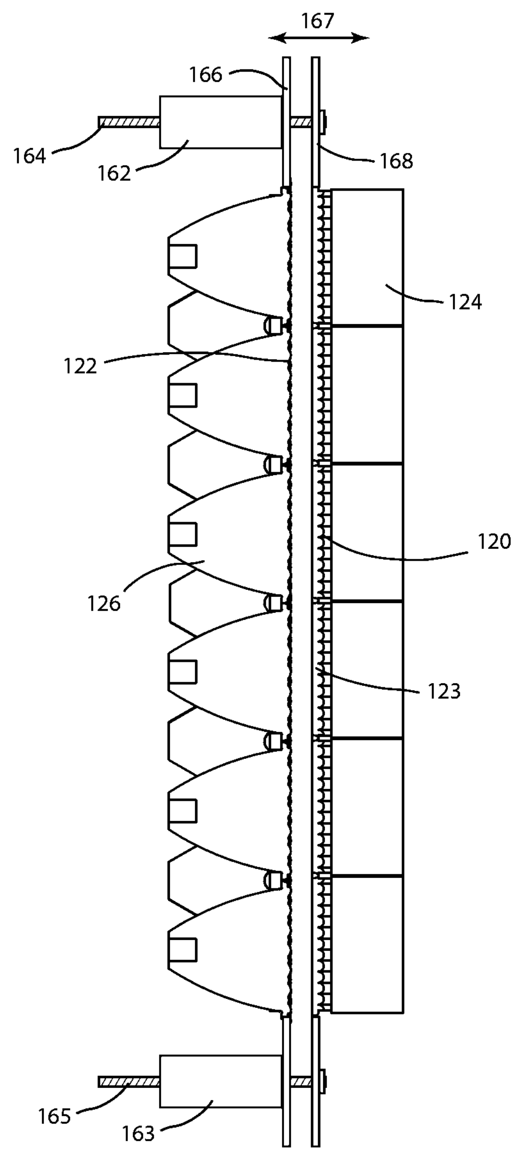
FIG. 10 illustrates a side cross-sectional view of an embodiment of the invention.

FIG. 10, an illustration of a side cross-sectional view of the embodiment detailed in FIG. 8. Louver masks 120 and 124 and second micro lens array 123 are mounted to carrier 168 to be carried back and forth in direction(s) 167 increasing or decreasing there distance from first micro lens array 122 as further described below. Stepper motor linear actuators 162 and 163 are mounted to plate 166 which is fixed relative to first micro lens array 122 and primary optic 126. The output rods 164 and 165 of linear actuators 162 and 163 are connected to carrier 168. As stepper motor linear actuators 162 and 163 are operated their respective output rods 164 and 165 will be extended or retracted, causing carrier plate 168 and attached louver masks 120 and 124 and second micro lens array 123 to move away from or closer to first micro lens array 122 and primary optic 126. Although two stepper motor linear actuators are herein illustrated the invention is not so limited and any number of stepper motor linear actuators may be utilized. Stepper motor linear actuators 162 and 163 may be operated cooperatively and simultaneously such that carrier 168 and its attached optical assembly remains parallel to plate 166 and its attached optical assembly.

Figure 11:
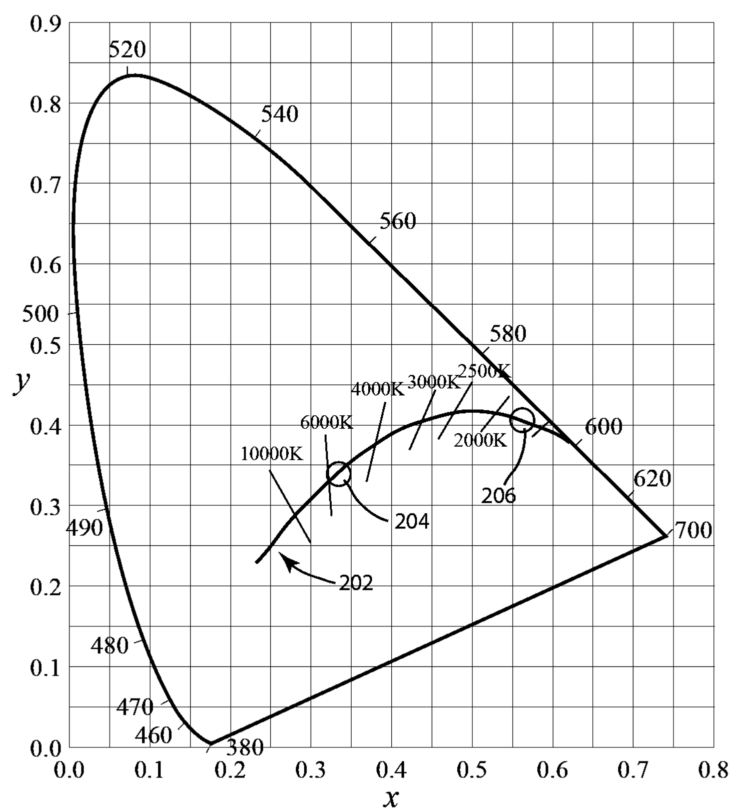
FIG. 11 illustrates the CIE 1931 chromaticity space with Planckian locus.
Figure 12:
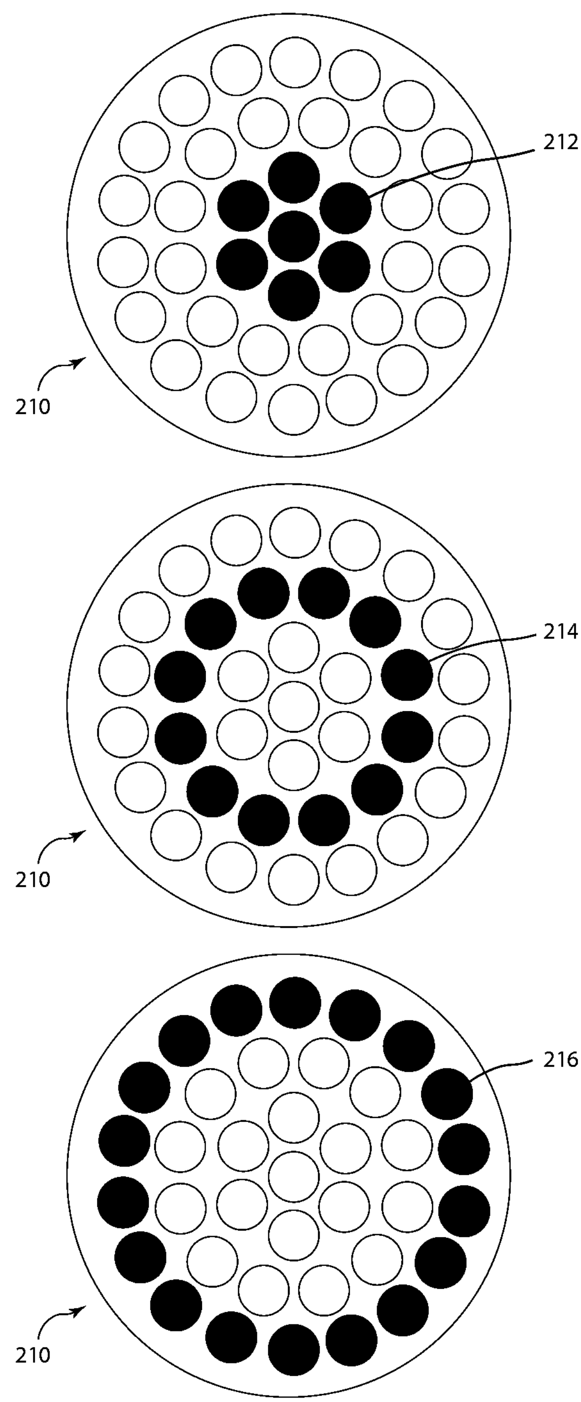
FIG. 12 illustrates strobe and control zones of an embodiment of the invention.

FIG. 11 and FIG. 12 illustrate a further improvements of the previously described embodiments of an LED based luminaire related to adjusting the white light produced by suitable combinations of intensities of colored light from LED modules 106. For example red, green and blue LEDs may be mixed to form a white light by choosing appropriate levels for each of the three colors. The color temperature of the white light produced may be selected from a range as illustrated by line 202 on the standard CIE 1931 chromaticity space as illustrated in FIG. 11. The range of white light points of different color temperatures are shown on such a diagram by the curved line 202 is well known as the Planckian Locus or Black Body Line. Specific points on the Planckian locus are defined by the color temperature at that point, where the color temperature is the temperature in Kelvin (K) that a theoretically perfect black body would have to be to emit the same radiation spectrum. For example, an incandescent lamp may have a color temperature of 3,200K which indicates that the white light radiation from it is the same as that emitted from a perfect black body heated to 3,200K. Color temperatures of white light may range from the very high, blue, end of the Planckian locus at 10,000K or more down to the very low, red, end at 1,000K or less. As an incandescent lamp is dimmed from full output to blackout its color temperature will drop and its color point will tend to move along the Planckian locus. This is familiar as the well-known phenomenon of an incandescent lamp getting redder as it dims. For example a lamp whose color temperature is 5,600K (as shown by point 204 in FIG. 11) may be dimmed in output and its color temperature may drop to around 1,500K (as shown by point 206 in FIG. 11). Although LED emitters do not naturally exhibit this phenomenon as they are dimmed, the described embodiment simulates such a color temperature shift by continuously varying the intensity mix of colored light from LED modules 106 so as to produce white light of the appropriate color temperature. Such a simulation in the change of color temperature as the luminaire is dimmed allows the LED luminaire to emulate the appearance of an incandescent luminaire. The desired combinations of the colored LED emitters necessary to produce white light of any required color temperature along the Planckian locus may be stored in a look-up table within the luminaire or calculated as needed from calibration parameters. To further improve the simulation of an incandescent light source by the disclosed LED luminaire further embodiments of the invention may also include a delay in the intensity control so as to simulate the thermal lag of an incandescent filament. When the power being supplied to an incandescent bulb is altered, the resultant light level emitted from the lamp doesn't immediately change to follow the power change. Instead there is a slight delay as the filament in the lamp either heats up or cools down until it reaches its new equilibrium. This delay, or thermal lag, is familiar to users of incandescent products and appears natural, thus the very rapid control of LED based luminaires, which follow power changes with almost no lag, can appear unnatural and mechanical. In the described invention means are provided, either through software or through electrical circuitry, to simulate this thermal lag by regulating the power supplied to the LED emitters so as to mimic the heat up and cool down delay of an incandescent filament.

FIG. 12 illustrates the strobe and control zones of an embodiment of the invention. In one embodiment of the invention the LED modules 106 are arranged in rings or control zones. FIG. 12 shows luminaire 210 with control zones 212, 214 and 216. Although three control zones are herein illustrated the invention is not so limited and any number and shape of control zones may be utilized. It is common in automated LED luminaires to provide a single strobe control channel for the entire luminaire such that varying speeds and styles of strobing may be selected for the luminaire. In one embodiment of the invention the luminaire is instead provided with a number of strobe control channels, one for each zone. Each of the control zones 212, 214 and 216 may be controlled individually and independently of the other control zones. In particular a different strobe speed and style may be applied to each of the control zones. These styles and speeds may further be coordinated such that a pleasing overall effect is obtained automatically. Strobe styles may be selected from a list comprising but not limited to; simple strobe, snap-ramp strobe, ramp-snap strobe, ramp-ramp strobe, random strobe, flicker strobe and other strobe styles known in the art. In yet further embodiments the overall synchronization of control zones may be coordinated through an additional master strobe channel and associated macros.

In further embodiments the color and intensity of control zones 212, 214, and/or 216 may be controlled individually and independently of the other control zones 212, 214, and/or 216. In such embodiments, a different color and intensity may be applied to each of the control zones 212, 214, and 216. These colors and intensities may further be coordinated such that a pleasing effect is obtained automatically. Examples of the effects possible are rainbow effects, color chases, and color waves. In further embodiments these color and intensity effects for each control zone 212, 214, and 216 acting independently or in synchronization may be pre-programmed in the luminaire such that the operator may recall a complete effect simply. In further embodiments a control channel is assigned to give the operator quick and direct access to such pre-programmed effects.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. A luminaire comprising:

an array of LED modules generating a directional light beam a first lenslet array a second lenslet array coupled with a first non-zero transparency multi-cell louver mask which is array which can be moved along the light beam a second multi-cell louver mask array where each cell is large enough to contain the area bounded by a plurality of cells from the first louver mask.

2. The luminaire of claim 1 wherein first louver mask is made of plastic.

3. The luminaire of claim 1 wherein the first louver mask is made of glass.

4. The luminaire of claim 1 wherein the first louver mask is more transparent than non-transparent.

5. The luminaire of claim 1 wherein first louver mask is close to full transparency.

6. The luminaire of claim 4 wherein second louver mask is non-transparent.

7. The luminaire of claim 4 wherein second louver mask is more non-transparent than transparent.

8. The luminaire of claim 4 wherein second louver mask is more transparent than non-transparent.

9. The luminaire of claim 4 wherein second louver mask is close to full transparency.

10. The luminaire of claim 8 which further comprises a third louver mask which is large enough to bound the area of the second multi-louver mask.

11. The luminaire of claim 9 wherein third louver mask is non-transparent.

* * * * *

UNITED STATES PATENT AND TRADEMARK OFFICE

CERTIFICATE OF CORRECTION

PATENT NO. : 10,145,540 B2
APPLICATION NO. : 13/225534
DATED : December 4, 2018
INVENTOR(S) : Pavel Jurik et al.

It is certified that error appears in the above-identified patent and that said Letters Patent is hereby corrected as shown below:

On the Title Page

Item (54) should read as follows --BEAM CONTROL SYSTEM FOR AN LED LUMINAIRE--.

In the Claims

Column 8, Claim 2, Line 29 replace “wherein first” with --wherein the first--; Claim 5, Line 35 replace “wherein first” with --wherein the first--; Claim 6, Line 37 replace “wherein second” with --wherein the second--; Claim 7, Line 39 replace “wherein second” with --wherein the second--; Claim 8, Line 41 replace “wherein second” with --wherein the second--; Claim 9, Line 43 replace “wherein second” with --wherein the second--; Claim 11, Line 48 replace “wherein third” with --wherein the third--.

Signed and Sealed this
Sixteenth Day of April, 2019

Andrei Iancu
*Director of the United States Patent and Trademark Office*